March 12, 1968     J. H. ARSENAULT     3,372,414
APPARATUS FOR LASTING SHOES
Filed Sept. 22, 1966     9 Sheets-Sheet 1

INVENTOR
James H. Arsenault
BY
Arthur Z. Bookstein ATT'Y

March 12, 1968  J. H. ARSENAULT  3,372,414
APPARATUS FOR LASTING SHOES
Filed Sept. 22, 1966  9 Sheets-Sheet 3

March 12, 1968

J. H. ARSENAULT 3,372,414

APPARATUS FOR LASTING SHOES

Filed Sept. 22, 1966

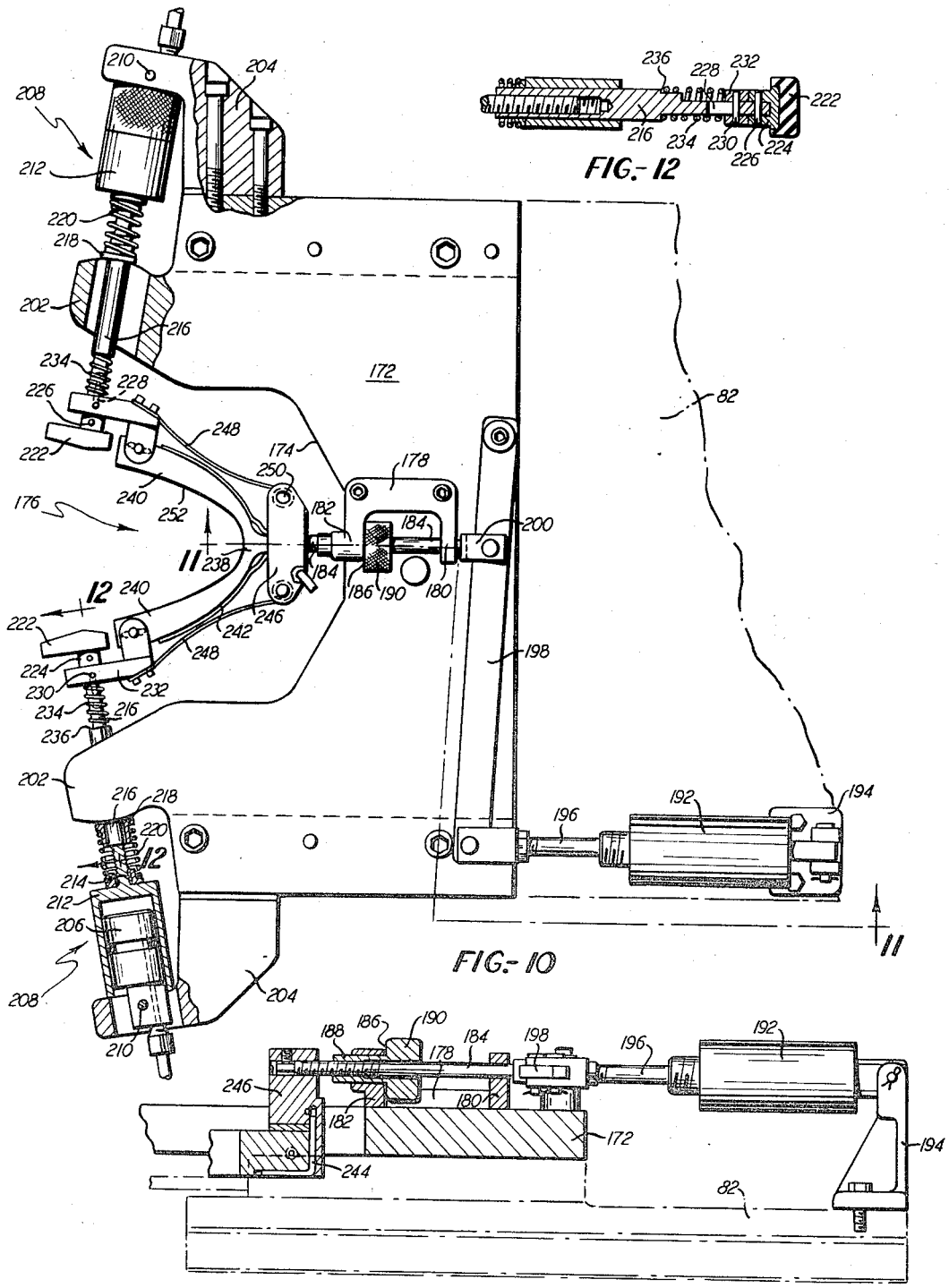

March 12, 1968

J. H. ARSENAULT 3,372,414

APPARATUS FOR LASTING SHOES

Filed Sept. 22, 1966

3,372,414
APPARATUS FOR LASTING SHOES
James H. Arsenault, Whitinsville, Mass., assignor to
Jacob S. Kamborian, West Newton, Mass.
Filed Sept. 22, 1966, Ser. No. 581,218
8 Claims. (Cl. 12—8.2)

This invention is concerned with the manufacture of shoes and more particularly with the operation of stretching a shoe upper about a form or a last in preparation for subsequent shoe manufacturing and finishing operations. It is an improvement over the inventions disclosed in pending United States applications Ser. No. 340,411 filed Jan. 27, 1964, now Patent No. 3,332,096 and Ser. No. 472,525 filed July 16, 1965.

Disclosed in the aforementioned United States patent applications are devices for pulling over and stretching a shoe upper about a last in preparation for subsequent operations wherein the shoe upper is permanently secured, as by adhesively bonding, to the insole. The apparatus in which the subject matter of the instant invention is incorporated includes a support for supporting a shoe assembly including a last having an insole located at the bottom thereof and a shoe upper draped thereabout, in a bottom-down position. Pincers are provided in the apparatus for gripping the marginal portion of the toe end of the upper and subsequently pulling downwardly on the upper so as to stretch the upper into conformity with the shape of the last. The apparatus is further provided with means for raising the pulled over shoe assembly into engagement with a substantially U-shaped yoke that is disposed in the apparatus at a level that is above that of the shoe supporting means. The interior surface of the yoke substantially parallels but is more narrow than the corresponding portion of the toe end of the shoe assembly that is to be brought into engagement with the yoke so that the periphery of the toe end overlaps the yoke. The yoke is so constructed as to have a limited amount of resilience so that as the end of the shoe assembly is brought into engagement with the yoke, the yoke may exert a yieldable, inward force on the last thereby tending to firmly press the upper against the last so that as the shoe assembly continues its upward movement the yoke may effect a further stretching and pulling over of the upper about the last.

Inasmuch as the yoke engages the upper in the peripheral region of the forepart thereof it may be desirable to maintain the yoke in an out-of-the-way position so as to preclude its engagement with the shoe assembly during the rise of the shoe assembly when shoes of the moccasin type having a ridge or seamline formed at the peripheral portion of the forepart of the upper are to be manufactured. It has been found that when the yoke is not maintained in an out-of-the-way position and does engage the forepart of a moccasin type shoe assembly the ridge or seamline tends to snag on the yoke thereby marring or tearing the upper. The subject of the instant invention is to provide a yoke and a mounting mechanism therefor that is adapted to be used with both shoes of the moccasin and non-moccasin type.

In the accompanying drawings:

FIGURE 10 is a plan view of the yoke assembly and drive mechanism therefor that is the subject of the instant invention;

FIGURE 11 is a side view, partly in section of the yoke driving mechanism as seen along the line 11—11 of FIGURE 10;

FIGURE 12 is a sectional view of the bumper mechanism as seen along the line 12—12 of FIGURE 10;

Figure 1:
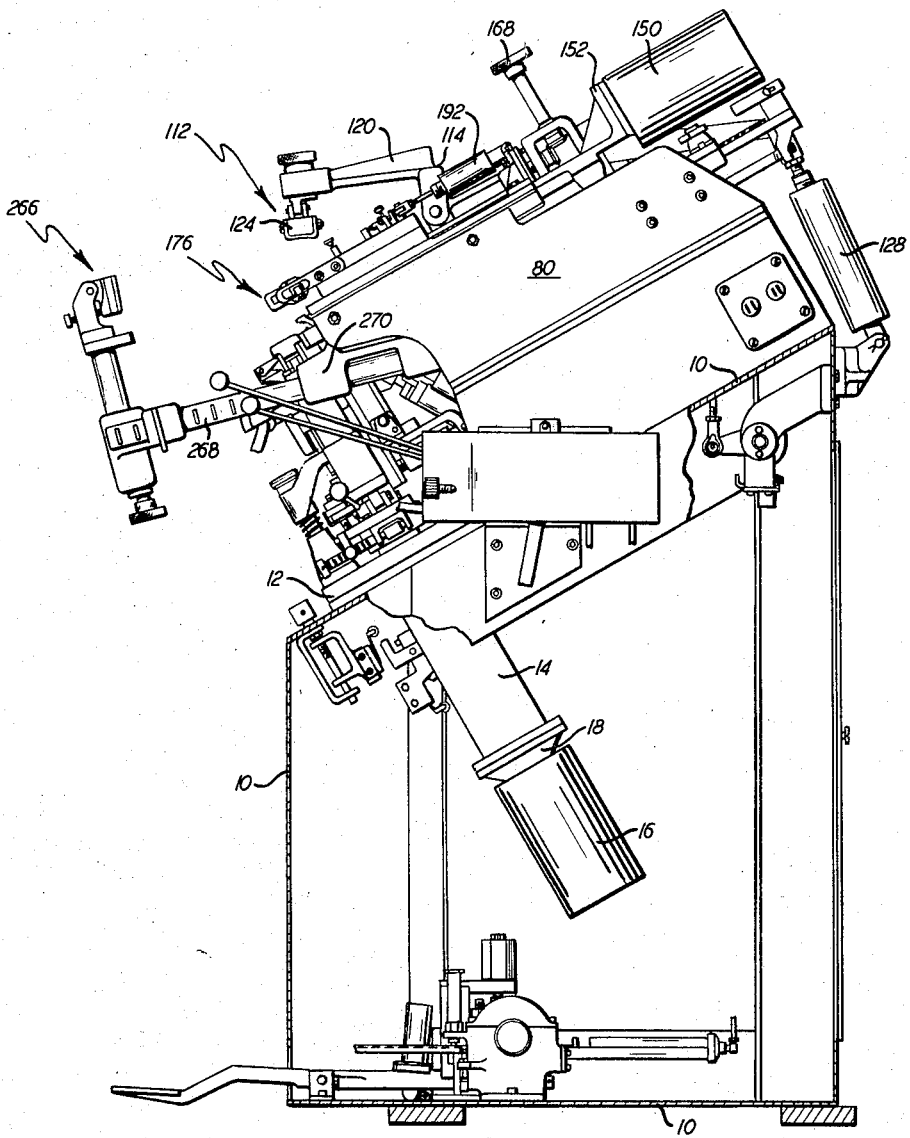
FIGURE 1 is a side elevation of the machine in which the subject of a instant invention is incorporated.

Referring to FIGURE 1 the machine has a frame 10 having a base plate 12 formed thereon and a sleeve 14 extending downwardly from the base plate 12. For convenience of operation, the base plate 12 is inclined about 30 degrees from the horizontal. For ease of explanation, directions that parallel the plane of the base plate 12 will hereinafter be referred to as extending horizontally and directions paralleling that of the sleeve 14 will hereinafter be referred to as extending vertically. The operator is intended to be located to the left of the machine as seen in FIGURE 1, and a direction extending towards the operator (right to left in FIGURE 1) will be referred to as forward while a direction extending away from the operator (left to right in FIGURE 1) will be referred to as rearward.

Figure 3:
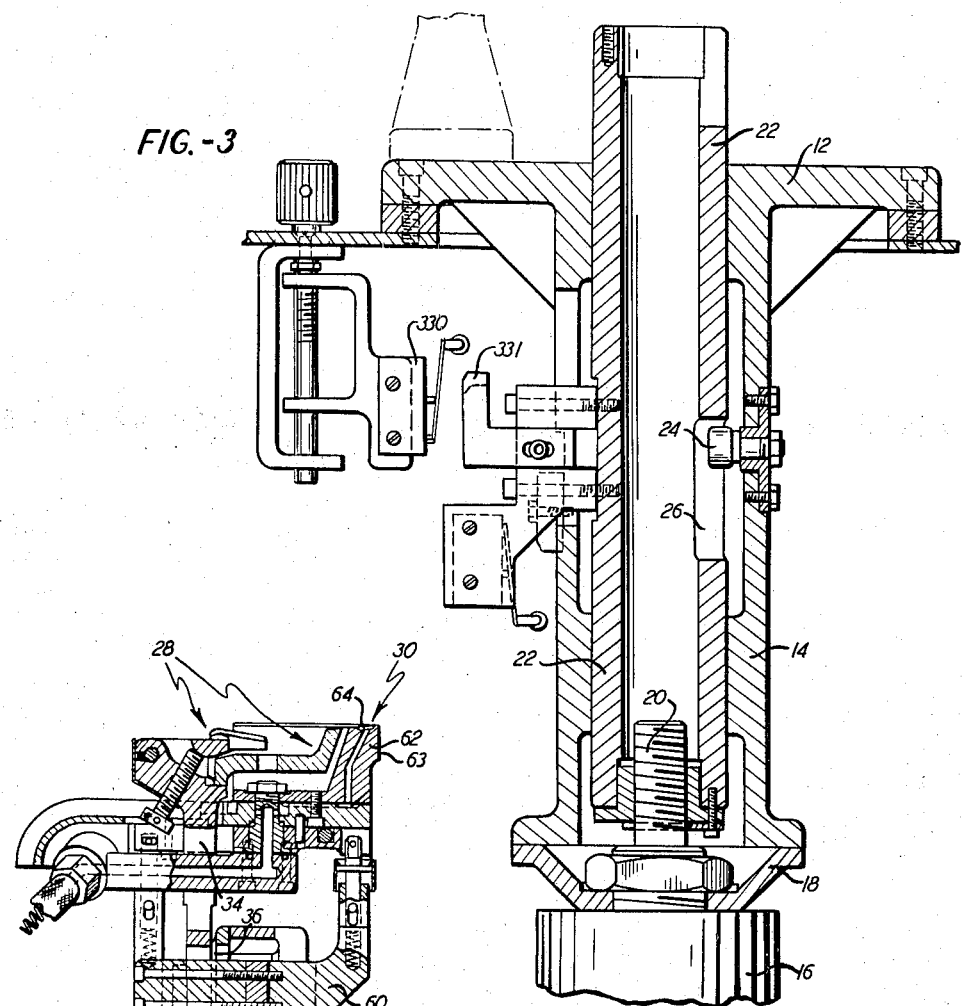
FIGURE 3 is a vertical section of the sleeve and the toe post movable therein on which the shoe assembly is ultimately supported.

An air operated motor 16 is secured to a cap 18 at the bottom of the sleeve, and has a piston rod 20 extending upwardly within the sleeve 14 (see FIGURE 3). A toe post 22 is contained within the sleeve 14 for vertical sliding movement therein and is connected to the piston rod 20 of the motor 16. A roller 24 mounted to the sleeve and extending inwardly thereof is received in a vertical slot 26 in the post 22 to preclude rotation of the post about the axis of the sleeve 14. The upper end of the toe post extends upwardly beyond the level of the base plate 12. A number of shoe operating instrumentalities, hereinafter described, are supported by the upwardly extending end of the toe post 22 for heightwise movement therewith.

Figure 2:
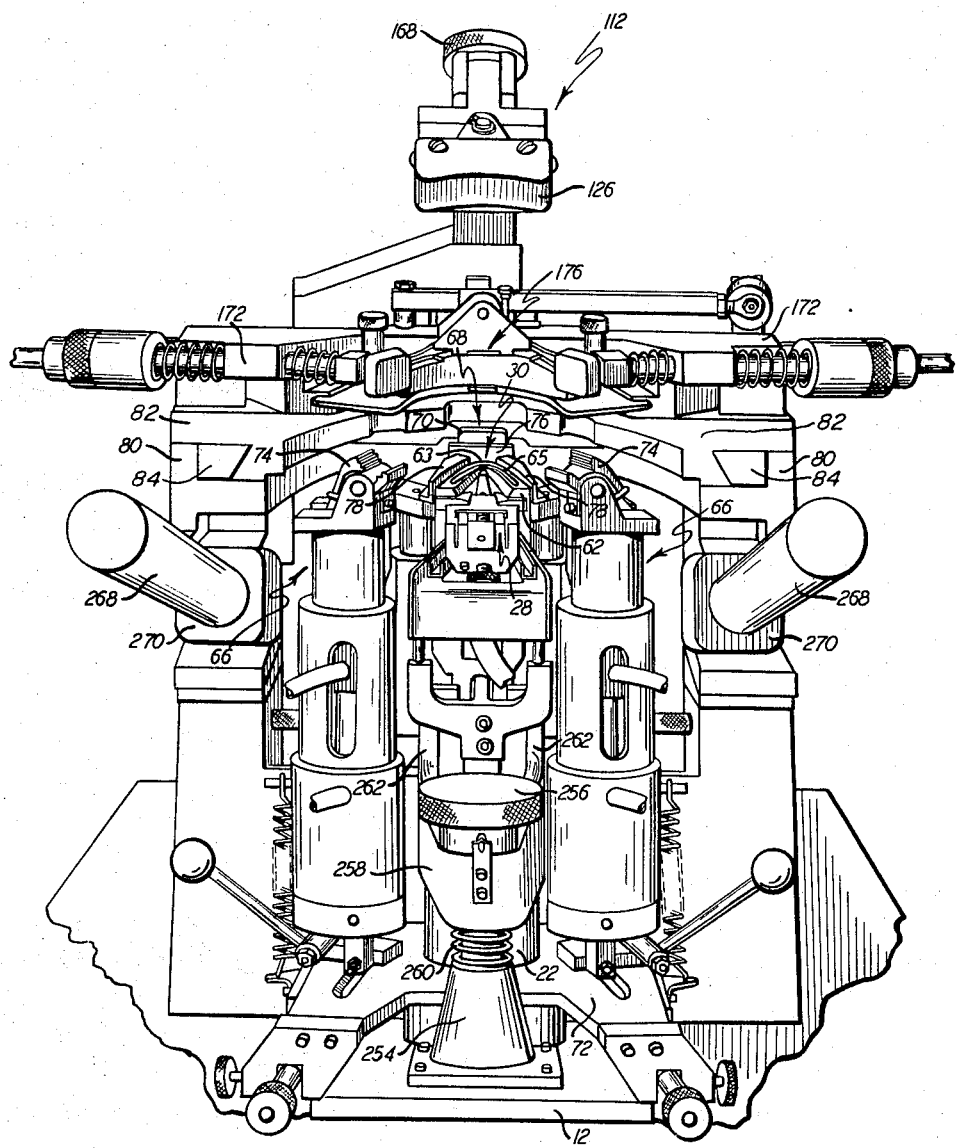
FIGURE 2 is a front elevation of the upper portion of the machine.
Figure 4:
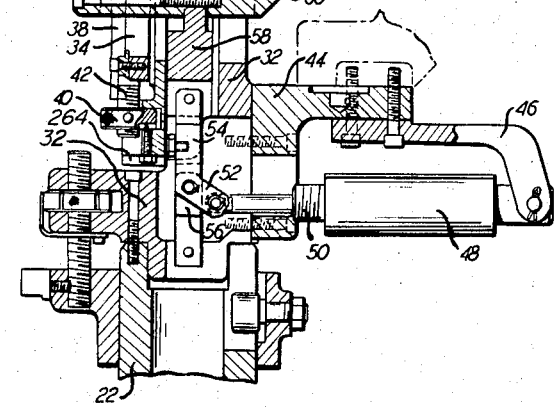
FIGURE 4 is a side elevation in section of the shoe assembly supporting members and the adhesive applicator that are mounted to the upper end of the toe post and directly support the shoe assembly.

Referring to FIGURES 2 and 4, it may be seen that among the shoe operating instrumentalities that are supported on the toe post are an insole rest assembly 28 and an adhesive applicator assembly 30. The particular construction of these shoe manufacturing instrumentalities will be described only to the extent necessary to define the operating environment of the subject of the instant invention, reference being made to the aforesaid United States applications for a more detailed disclosure thereof. The insole rest assembly 28 and adhesive applicator assembly 30 are mounted to the toe post by means of a toe post extension 32 that is secured to the upwardly extending end of the toe post. The insole rest assembly 28 on which the bottom forepart of the shoe assembly rests, is mounted on a bar 34 which in turn is slidably mounted for vertical movement between a bearing plate 36 and the gibs 38 that are secured to the toe post extension 32. A nut 40 rotatably mounted to the toe post extension 32 is in threaded engagement with a screw 42 that is fastened to the bar 34 so that rotation of the nut may effect vertical adjustment of the bar 34 and the insole rest assembly 28 mounted thereupon and consequently the elevation of the shoe assembly with respect to the post 22.

The adhesive applicator assembly 30 is mounted to the toe post extension 32 so as to have movement that is both unitary with and independent of the toe post 22. As illustrated in FIGURE 4 a rearwardly extending ledge 44 of the toe post extension 32 has a hanger 46 depending therefrom and an air operated motor 48 is pivoted to the hanger 46. The piston rod 50 of the motor 48 is pivoted to a link 52, and the link 52 is pivoted to a pair of toggle links 54 and 56, the toggle link 56 extending downwardly of the link 52 and being pivoted to the toe post extension 32 with the link 54 extending upwardly of the link 52 and being pivoted to a slide 58 that is guided for vertical sliding movement between the toe post extension 32 and the bearing plate 36. An adhesive applicator mount 60 is secured to the slide 58 and extends upwardly therefrom. The adhesive applicator assembly 30 is mounted atop the adhesive applicator mount 60 for yieldable and limited tilting universal movement with respect thereto. The adhesive applicator assembly 30 includes an adhesive applicating member 62 of substantially U-shaped configuration and having a dispensing trough 64 located at its upper surface that is adapted to engage the bottom of the insole and distribute a ribbon of adhesive to the marginal portion of the toe end of the bottom of the insole I. The adhesive applicator 62 has a bight 63 and a pair of legs 65 diverging rearwardly from the bight 63 and embraces the insole rest assembly 28 as shown in FIGURE 2. Means, fully disclosed in United States application Ser. No. 472,525 filed July 16, 1965 are provided for communicating adhesive from a source thereof to the trough 64 of the adhesive applicating member 62. It may thus be seen that the insole rest assembly 28 and the adhesive applicator 30 may have movement that is both unitary with and independent of the toe post 22 and of each other.

Referring to FIGURE 2 it may be seen that also supported on the toe post 22 for movement in unison therewith are a pair of side pincer assemblies 66 and a toe pincer assembly 68. The toe pincer assembly 68 is mounted to the ledge 44 and extends upwardly such that the jaws 70 thereof may be disposed adjacent and rearwardly of the bight 63 of the adhesive applicator member 62.

The side pincer assemblies 66 are supported about the toe post 22 by means of a platform 72 that is adjustably mounted for vertical movement on the toe post 22 between the toe post extension 32 and the base plate 12. The side pincer assemblies are supported in such a manner as to extend upwardly such that the jaws 74 thereof are disposed outwardly of each leg 65 of the adhesive applicator member 62. The vertical adjustment of the platform 72 is effective to permit vertical adjustment of the side pincer assemblies that are mounted thereto so as to raise or lower the jaws 74 thereof to a level such that when the shoe assembly is placed on the insole rest assembly 28 the downwardly extending margin M of the upper U thereof may extend into the open jaws 74 in readiness to be gripped thereby.

Both the toe pincer assembly 68 and the side pincer assemblies 66 are so constructed that the jaws 70 and 74 thereof may be closed to grip a marginal portion M of the shoe upper U and subsequently move downwardly to stretch the shoe upper U about the last L. As the pincer assemblies 66 and 68 move downwardly to stretch the upper about the last L, downward movement of the last L and insole I therewith is precluded by means of the rigid insole rest assembly 28 upon which the last and insole bear.

As more fully disclosed in the aforesaid United States applications Ser. No. 340,411 and Ser. No. 472,525 filed respectively on Jan. 27, 1964 and July 16, 1965, a front retarder 76 is interposed between the bight 63 of the adhesive applicator member 62 and the toe pincer jaws 70 and a pair of side retarders 78 are located outwardly of the legs 65 of the applicator member 62. Each of the retarders 76, 78 are yieldably urged upwardly so as to extend above the level of the applicator member 62. The retarders 76, 78 serve a multitude of purposes among which are to aid in properly locating the shoe assembly on the insole rest assembly 28 and to thereafter aid in the stretching of the upper U as well as to aid in temporarily maintaining the upper in a pulled-over condition when the toe and side pincers 70, 74 are caused to release their grip on the upper U as will be described later, reference again being made to the aforesaid United States applications for a complete description of the construction and operation thereof.

During the aforesaid shoe upper stretching operation the motor 16 is in a deactivated condition such that the toe post 22 and the aforesaid shoe operating insrumentalities supported thereon are in a downward position. After the aforesaid shoe upper stretching operation has been effected, the motor 16 is actuated to cause the toe post and the shoe operating instrumentalities supported thereon together with the shoe assembly to rise. Referring to FIGURES 1 and 2 it may be seen that the frame 10 includes a head 80 located rearwardly of the aforementioned devices. Mounted to and about the head 80 are devices for effecting a further pulling over and stretching of the shoe upper U about the last L, rigidly clamping selected portions of the shoe assembly in preparation for subsequent shoe manufacturing operations and wiping the marginal portions of the upper U to corresponding marginal portions of the insole I. These devices are supported on a slide plate 82 that is mounted for forward and rearward horizontal sliding movement on gibs 84 formed in the head 80 so as to be movable between a rearward, out-of-the-way and a forward, working position.

Referring to FIGURES 6, 7, 8 and 9 it may be seen that the drive mechanism for the slide plate 82 includes an air actuated motor 86 that is secured to a block 88 and has a piston rod 90 extending rearwardly thereof. The block 88 is secured to the frame 10 in the manner described below. The piston rod 90 is secured to a bar 92 that is slidably mounted in the block above the piston rod. A rack 94 formed on the bar is in mesh with a pinion 96 that is pinned to a shaft 98 and the shaft is rotatable in a pair of trunnions 100 that are fixed to the block 88. A crank 102 pinned to the shaft 98 is pivotally connected by a pin 104 to a pitman 106 and the pitman is pivotally connected by a pin 108 to a lug 110 that depends from the slide plate 82. It may thus be seen that actuation of the motor 86 is effective to move the slide plate 82 forwardly or rearwardly in the gibs 84.

Figure 5:
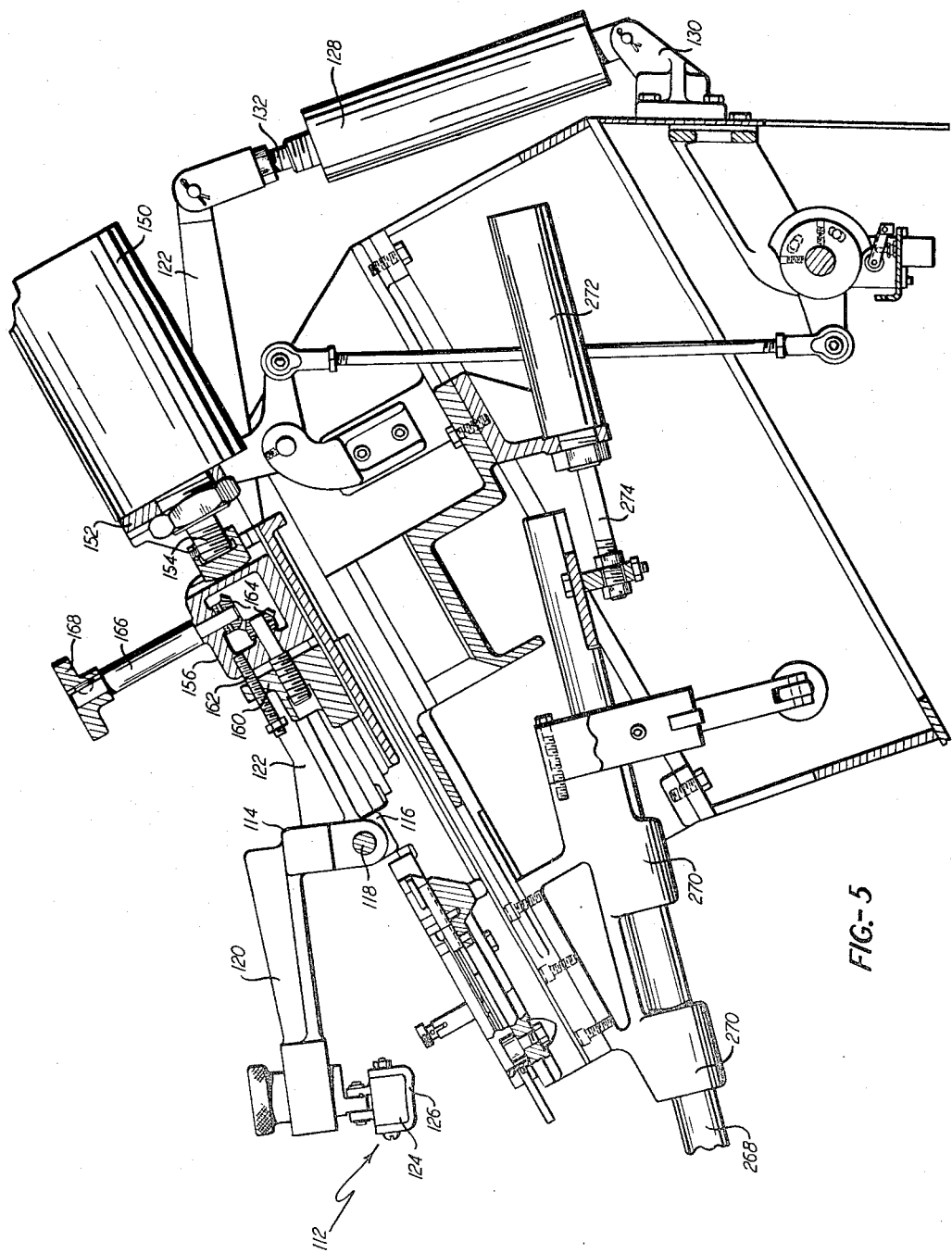
FIGURE 5 is a side elevation of a portion of the machine illustrating the hold-down and wiper driving mechanisms and the heel clamp operating mechanism.
Figure 6:
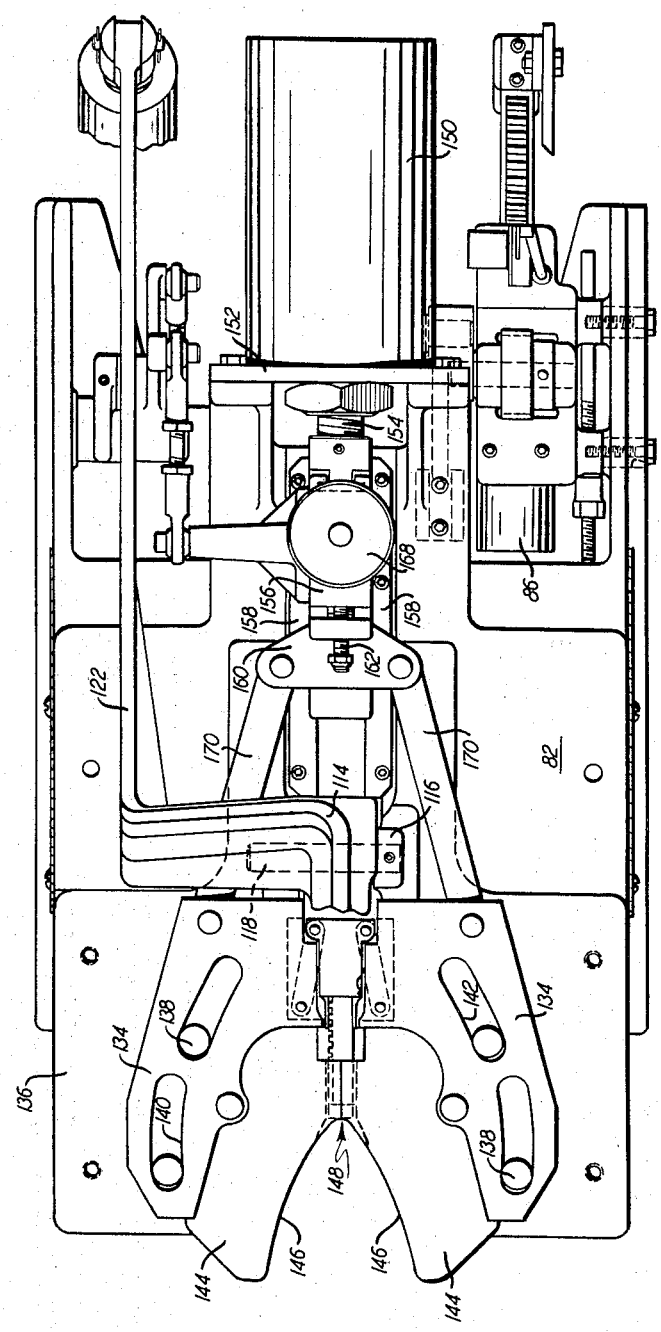
FIGURE 6 is a plan view of the wiper driving mechanism taken along the line 6—6 of FIGURE 5.
Figure 7:
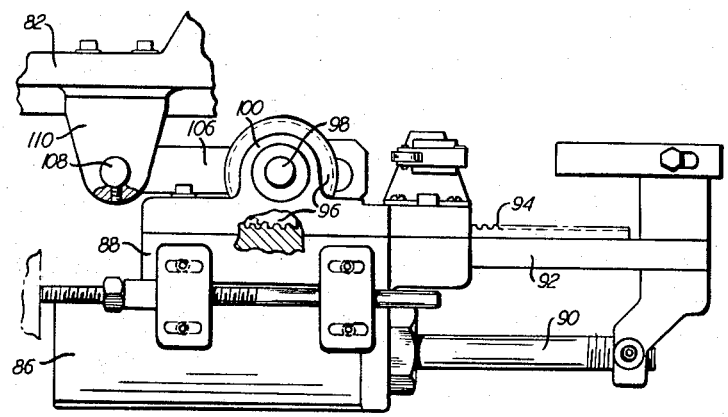
FIGURE 7 is a side elevation of a portion of the machine showing an arrangement for moving the main slide plate from a rearward out-of-the-way position to a forward working position.
Figure 8:
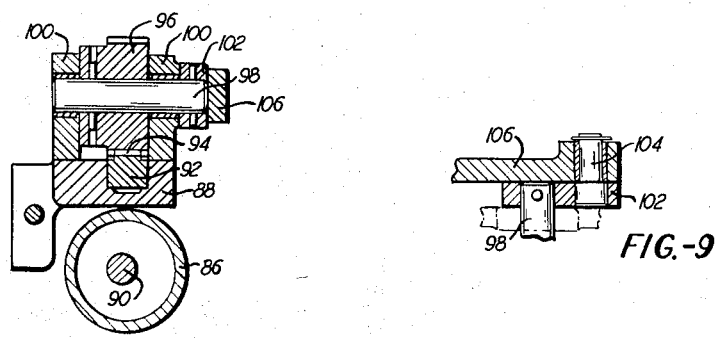
FIGURE 8 is a view taken along the line 8—8 of FIGURE 7.
Figure 9:
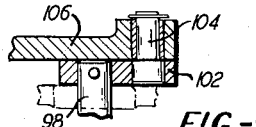
FIGURE 9 is a view taken along the line 9—9 of FIGURE 7.

During the rise of the pulled-over shoe assembly in response to actuation of the motor 16, a toe-holddown 112 is caused to be brought downwardly into engagement with the top of the forepart of the shoe assembly so as to further rigidly clamp the toe end of the shoe assembly between it and the insole rest assembly. Referring to FIGURES 1, 5 and 6 a hold-down lever 114 is pivotally mounted to the slide plate 82 by means of trunnions 116 that extend upwardly therefrom and a pin 118. The hold-down lever 114 being pivotally mounted thereto at a point intermediate its ends so that it has a forwardly extending portion 120 and a rearwardly extending portion 122. The toe hold-down 124 having a flexible holddown pad 126 thereon is secured to the forwardly extending end 120 of the lever 114. An air actuated motor 128 is pivotally mounted to a bracket 130 that is secured to the frame and has a piston rod 132 that is pivoted to the rearwardly extending end of the hold-down lever 114 such that upon actuation of the motor 128 the hold-down pad 126 may have substantially heightwise movement that is towards and away from the toe of the shoe assembly.

The wiping device is similarly mounted to the slide plate 82 for unitary movement therewith between the aforesaid forward and rearward positions. Referring to FIGURES 2, 5 and 6 a pair of symmetrically disposed wiper cams 134 are slidably supported on a thickened block 136 that forms the forward end of the slide plate 82. The block 136 has pins 138 upstanding therefrom that extend into cam slots 140 and 142 formed in the wiper cams. A pair of conventional wipers 144 having forwardly divergent edges 146 that diverge from a vertex 148 are mounted to the wiper cams 134. The movement of the wiper cams 134 and wipers 144 mounted thereto is governed by the configuration of the pins 138 and cam tracks 140 and 142 in the wiper cams 134. Inasmuch as the particular movement of the wipers 144 and wiper cams 134 is not germane to the subject of the instant invention, reference is hereby made to the aforesaid United States applications Ser. No. 340,411 and Ser. No. 472,525 filed respectively on Jan. 27, 1964 and July 16, 1965 for a full disclosure thereof, it being sufficient to note here that the wipers have components of movement that are both inwardly swinging and horizontally forward. The wiping stroke of the wipers 144 is effected, as may be seen from FIGURES 5 and 6, by means of an air actuated motor 150 that is secured to a flange 152 at the rear of the slide plate 82. The piston rod 154 of the motor 150 is connected to a housing 156 that is slidably mounted in gibs 158 formed in the slide plate. A block 160 is slidably supported in the gibs 158 forwardly of the housing and is connected to the housing by a bolt 162 that is threaded into the block 160 and extends rearwardly therefrom into the housing 156. The bolt 162 is connected by bevel gears 164 within the housing 156 to a pin 166 that extends upwardly and out of the housing, a knob 168 being secured to the upwardly extending end of the pin 166. Forwardly diverging links 170 are pivotally connected at their rearward ends to the block 160 and at their forward ends to the wiper cams 134. It may thus be seen that actuation of the motor 150 may cause the block 160 and the forwardly diverging links 170 to move forwardly thereby effecting the desired movement of the wiper cams and wipers 144 mounted thereto.

Referring to FIGURES 2, 10, 11 and 12 a cover block 172 is secured to the block 136 and extends above the wiper cams 134 so as to thereby preclude vertical movement of the wiper cams 134 thus insuring that the movement of the wipers 144 will be in a purely horizontal plane. The cover block 172 has a cut-out 174 formed at its forward end to accommodate a flexible shoe conforming pad or yoke 176. A U-shaped bracket 178 having a rear leg 180 and a front leg 182 is bolted to the top of the block. A stud 184 extends forwardly through the legs 180 and 182 of the bracket 178 and has a stop nut 186 threaded thereon, the stop nut having a forwardly extending sleeve portion 188 that is slidably contained within the forward leg 182 of the bracket 178 and a collar portion 190 that is contained between the legs 180 and 182 of the bracket.

An air actuated motor 192 sometimes referred to herein as "force applying means" is pivotally connected to the slide plate 82 by means of a bracket 194 and has a piston rod 196 extending forwardly therefrom. The piston rod 196 of the motor 192 is pivotally connected to one end of a drive bar 198, the other end of the drive bar 198 being pivoted to the cover block 172. The rearwardly protruding end of the stud 184 is pivotally connected by means of a clevis 200 to the drive bar 198 at a point intermediate the ends of the drive bar so that upon actuation of the motor 192 the drive bar 198 may be pivoted in a forward-rearward direction thereby effecting forward-rearward movement of the stud 184. The limit of forward movement of the stud 184 is governed by the position of the stop nut 186 thereon, forward movement of the stud 184 terminating upon engagement of the collar portion 190 of the stop nut with the interior surface of the forward leg 182 of the U-shaped bracket 178. Mounted to the forwardly extending end of the stud 184, in a manner later described, is the yoke assembly 176.

The block 172 is formed into inner flanges 202 at the forward ends of the cut-out 174 and outer flanges 204 that are bolted to the block 172. The piston 206 of an air actuated motor 208 is pivotally secured to each flange 204 by a pin 210 to extend inwardly thereof and a cylinder 212 is slidable on each piston 206. Each cylinder 212 has a screw 214 extending inwardly thereof that is threaded into a bar 216, the bars 216 being slidably mounted in the inner flanges 202. A sleeve 218 is slidably mounted on each bar 216 to bear against the exterior of the inner flange 202, and compression springs 220 interposed between the sleeves and the cylinders 212 serve to yieldably urge the cylinders and the bars 216 outwardly with the cylinders abutting against the outer flanges 204. A rubber bumper 222 is mounted on a mount 224 that in turn is pivotally secured to the inner end of each bar 216 by a pin 226. Slots 228, formed on the bar 216 outwardly of the bumpers 222 and pins 226 receive pins 230 that are secured to brackets 232. Compression springs 234 interposed between shoulders 236 on the bars 216 and the brackets 232 serve to yieldably urge the brackets inwardly with the pins 230 engaging the inner ends of the slots 228.

The yoke 176 is of substantially U-shaped configuration and has a bight 238 and a pair of legs 240 extending forwardly of the bight and on opposite sides thereof. The yoke 176 is made of a flexible, deformable material such as Teflon and has a pair of bowed springs 242 extending exteriorly of each yoke leg from the bight forwardly thereof. The bight 238 of the yoke is received in a socket 244 of a bracket 246, the bracket 246 being in turn secured to the forwardly extending end of the stud 184. The bracket 246 has a spring arm 248 secured thereto and extending rearwardly thereof that is entwined at its rear end on a pin 250 located in the mounting bracket 246. The yoke 176 is located in the machine directly above the wipers 144 and is disposed in such a manner that when the main slide plate 82 is moved to a forward working position the inner yoke wall 252 which serves as an upwiping member will be above and overlapped by the periphery of the toe portion of the shoe assembly so that when the motor 16 is actuated to raise the toe post 22 and the shoe assembly supported thereon the periphery of the forepart of the shoe assembly may engage the inner wall of the yoke 176 whereupon continued upward movement of the shoe assembly may cause the yoke to effect the aforesaid upwiping operation on the shoe assembly. When the shoe assembly is forced upwardly by the motor 16 the yoke wall 252 the bight 238 of the yoke 176 flexes rearwardly against the pressure exerted by the motor 192 and the yoke legs 240 flex outwardly against the pressure exerted by the springs 242. It should be noted that during this upwiping operation the motor 192 is caused by means of the control circuit, to resiliently urge the stud 184 and the yoke assembly 176 mounted thereto forwardly against the periphery of the shoe under a relatively low but definite pressure. The control circuit may incorporate pressure regulating devices which are common in the art to precisely adjust the pressure exerted by the motor 192 in accordance with the frailty or toughness of the upper material that is to be used. After this, the brackets 232 and the spring arms 248 swing outwardly about the pins 250 and move the pins 230 outwardly in the slots 232 against the yieldable forces exerted by the springs 234 with the brackets 232 moving away from the mounts 224. The yieldable forces exerted by the motor 192 and the springs 234 and 242 cause the yoke to snugly engage the upper U and cause the upper to snugly conform to the shape of the last L during this upwiping operation. The bearing of the holddown 112 against the top of the forepart of the shoe assembly under the aforementioned relatively light pressure during the rise of the shoe assembly prevents the shoe assembly from shifting with respect to the applicator 30 and insole rests 28 during its upper movement into the yoke 176. As will be later described, the pincers 66 are deactivated to release the upper margin so as to prepare the upper margin M for the subsequent wiping operation. In order to help maintain the upper in its stretched and pulled over condition after the pincers 66 release the upper margin M the motor 192 is actuated by high pressure air to cause the yoke to press against the periphery of the forepart of the shoe assembly under a greater clamping force than had heretofore been exerted and air is directed to the motors 208 to cause the legs 240 of the yoke 176 to be forced inwardly against the shoe assembly and to bring the bumpers 222 into pressing engagement with the sides of the shoe assembly. The bumpers 222 and yoke 176 are not caused to effect their clamping function until the toe post 22 has completed its rise and the shoe assembly is stationary.

Referring to FIGURES 1 and 2 it may be seen that the extent to which the toe post 22 and shoe assembly supported thereon may rise is determined by means of a column 254 that is secured to and extends upwardly of the base plate 12 forwardly of the post 22. A knob 256 is threaded into the column 254 and bears against a sleeve 258 that is yieldably urged upwardly against the knob 256 by a compression spring 260. A pair of lugs 262 are integral with and extend rearwardly of the sleeve 258. The vertical position of the lugs 262 may be adjusted by rotating the knob 256 to thereby lower or raise the sleeve 258 on the column 254. The lugs 262 are in vertical abutting alignment with a pair of tangs 264 extending outwardly of the toe post extension 44. Thus the height to which the toe post may be raised is limited by the vertical position of the lugs 262. The lugs 262 are adjusted to effect termination of the rise of the shoe assembly when the bottom of the insole I is just above the level of the upper surface of the wipers 144. The yoke 176 is disposed at a height in the machine such that when the shoe assembly completes its rise the upwiping operation will have been completed just as the insole I reaches the proper height with respect to the wipers 144.

As mentioned earlier, when fabricating shoes of the moccasin type in the machine it may be desirable to forego the upwiping operation so as not to mar or damage the upper material but utilize the yoke and bumper assemblies solely for their clamping function so as to maintain the upper in its pulled over and stretched condition in preparation for the wiping operation. The control circuit is thus provided with a means for operating the motor 192 in such a manner as to maintain the yoke assembly 176 in a rearward and out-of-the-way position during the rise of the shoe assembly but to thereafter actuate the motor 192 so as to bring the yoke wall 252 forwardly into engagement with the peripheral portion of the shoe assembly under relatively high pressure thereby clamping the upper to the last in the same manner as when shoes of the non-moccasin type are being fabricated; i.e. air is directed to the motors 208 to cause the legs 240 of the yoke 176 to be forced inwardly against the shoe assembly and to bring the bumpers 222 into pressing engagement with the sides of the shoe assembly.

After the yoke 176 and bumpers 222 have been actuated to effect their clamping functions the operation of the machine is identical to that of the apparatus disclosed in the aforesaid United States applications Ser. No. 340,411 filed Jan. 27, 1964 and Ser. No. 472,525 filed July 16, 1965. Referring to FIGURES 1, 2 and 5 a heel clamp 266, identical to that of the aforesaid United States applications is incorporated into the machine so as to be located forwardly of the shoe assembly and is mounted for movement that is towards and away from the shoe assembly so as to be engageable with the heel end thereof. The heel clamp 266 is supported by a pair of bars 268 that are slidably supported for forward-rearward movement in bosses 270 formed on the frame 10. An air motor 272 is mounted to the machine and has the piston rod 274 thereof connected to the bars 268 to effect the aforesaid forward-rearward movement of the bars 268 and heel clamp 266 mounted thereto. At about the same time as the toe post 22 and shoe assembly supported thereon complete their rise, the heel clamp 266 is caused to move rearwardly, engaging the shoe assembly just after its rise is terminated and thus further rigidifying the shoe assembly in preparation for subsequent shoe manufacturing operations. As more fully disclosed in the aforesaid United States aplications as the toe post 22 rises to bring the shoe assembly through the yoke 176 and to a proper level with respect to the wipers 144 the front pincers 68 are caused to release the toe end of the upper margin and be moved downwardly away from the shoe assembly so as not to mechanically interfere with the bottom surface of the wipers 144. As the toe post 22 nears completion of its rise the toe and side pincers 66, 68 are caused to release their gripping of the upper margin in a sequence fully described in the aforementioned United States applications and the retarders 76 and 78 are forced upwardly against the forepart of the upper to press the upper margin against the wiper bottoms to thereby aid in maintaining the upper in its pulled over condition (see FIGURES 17, 18). It should be noted that during the rise of the shoe assembly the pressure of the retarders 76 and 78 against the wiper bottoms must be sufficiently light as to enable the upper margin M to slip to some extent between the retarders and the wiper bottoms so that the upper will not be damaged or torn. At the completion of the rise of the shoe assembly the retarders are pressed against the wiper bottoms with a greater force to hold the upper margin more firmly against the wiper bottom for the subsequent wiping operation. When the sequence of operation has reached the stage when the wipers 144 are to be actuated by the control circuit, the shoe assembly is rigidly clamped into position by means of cooperation of the heel clamp 266, the insole rest assembly 28 and the toe holddown 112 with the upper being maintained in its pulled over condition by means of cooperation of the yoke 176 bumpers 222 and the pressing of the upper margin between the retarders 76 and 78 and the bottom surface of the wipers 144. The control circuit then causes actuation of the motor 150 to effect a wiping movement of the wipers 144. During the wiper stroke the adhesive applicator 62 is first lowered out of the path of movement of oncoming wipers 144. After this the pressures applied by the retarders 76 and 78 forcing the upper margin M against the wiper bottoms is relieved, the timing being such that this takes place after the wipers have crossed under the insole and have started to wiper the upper margin against the insole so that the stretching of the upper about the last that had been maintained by the retarders is taken over by the wipers with the result that the stretching of the upper about the last is maintained throughout the wiper stroke. This is aided by the fact that the yoke 176 and bumpers 222 are being pressed against the shoe assembly under relatively high pressure. This is followed by the lowering of the insole rest assembly 28 out of the path of the oncoming wipers so that the shoe assembly is supported on its bottom solely by the wipers 144 thus enabling the holddown 112 to press the shoe assembly downwardly directly against the wipers 144 and provide an overwiping pressure. Towards the end of the wiping stroke the holddown is caused to be forced downwardly under relatively heavy pressure for a predetermined length of time to iron the now wiped upper margin against the insole and to enable the adhesive that had been extruded between the wiped upper margin and insole to firmly bond the upper margin to the insole. At the end of this predetermined length of time the machine parts are returned by means of the control circuit to their idle position and the shoe may be removed from the machine.

Figure 13:
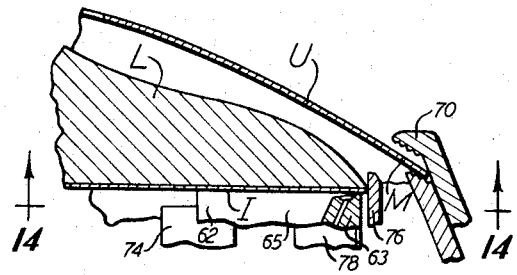
FIGURE 13 is a representation of the shoe assembly as it appears when it is initially placed in the machine.
Figure 14:
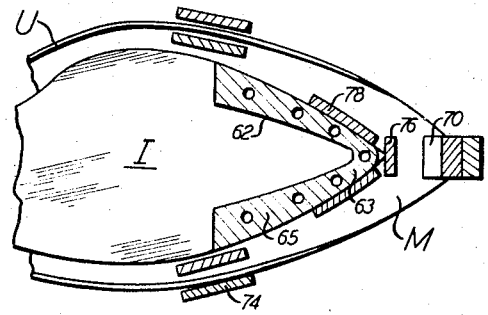
FIGURE 14 is a view taken along the line 14—14 of FIGURE 13.
Figure 22:
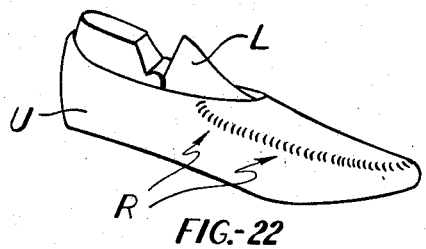
FIGURE 22 is an illustration of a shoe assembly of the moccasin type having a ridge or seamline formed along the vamp of the upper.
Figure 15:
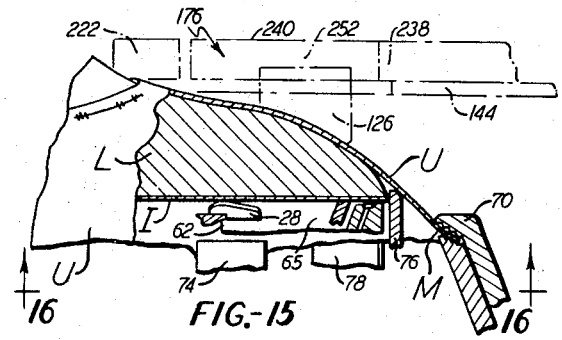
FIGURE 15 is a representation of the shoe assembly as it appears in the machine after the upper has been pulled over about the last with the yoke assembly disposed above the shoe assembly in readiness for performance of the upwiping operation.
Figure 16:
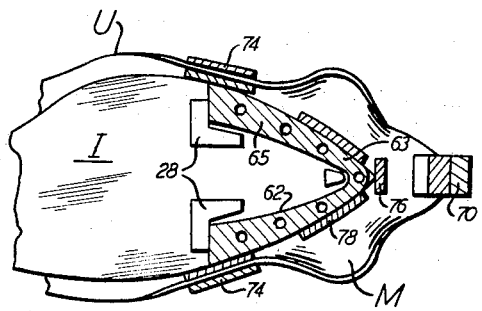
FIGURE 16 is a view taken along the line 16—16 of FIGURE 15.

Summarizing the operation of the machine and the invention incorporated therein, the operator places a shoe assembly that includes a last L having an insole I located at the bottom thereof and a shoe upper U draped thereabout, in the machine in a bottom down position with the toe end of the shoe assembly extending rearwardly toward the machine. The toe end of the shoe assembly is placed on the adhesive applicator 62 and the shoe assembly is then urged rearwardly so that the peripheral portion of the toe end thereof may be brought into abutment with the adjacent sides of the retarders 76 and 78 that embrace the adhesive applicator 62 and extend upwardly thereof when in an idle position (FIGURES 13 and 14). Thus the retarders 76 and 78 also serve to aid in the positioning of the shoe assembly in the machine. When the operator determines that the shoe assembly is properly positioned he actuates the control circuit as fully disclosed in the aforementioned United States applications to thereby cause the toe pincer 70 to close and grip the upper margin M. After inspecting the shoe assembly to determine if the toe pincer 70 has properly gripped the upper margin the operator then actuates the control circuit to cause the side pincers 74 to grip the side portions of the upper margin M and to thereafter effect a downward moving of the toe and side pincers 70 and 74 thereby stretching the upper U about the last so that the shoe assembly assumes the position shown in FIGURES 15 and 16. As the toe and side pincers 70 and 74 move downwardly the shoe assembly urges the adhesive applicator 62 to move downwardly therewith, the adhesive applicator 62 being mounted to the machine for yieldable downward and limited tilting movement as fully described in the aforesaid United States applications. The downward movement of the shoe assembly and the adhesive applicator 62 is terminated when the bottom of the insole I is brought into abutting engagement with the rigid insole rest assembly 28 (FIGURE 15). The control circuit then causes the machine to pause in its cycle to permit further inspection of the disposition of the shoe assembly in the machine and the pulling over of the upper about the last. The operator then actuates the control circuit which in turn actuates the motor 86 to move the slide plate 82 and all the shoe operating instrumentalities supported thereon from a rearward out-of-the-way position to a forward working position as shown in FIGURE 15 in phantom. At or about the time when the slide plate 82 is in its forward position the control circuit causes actuation of the motor 16 to raise the post 22 and the pulled over shoe assembly therewith. Adhesive may be extruded from the adhesive applicator 62 onto the bottom of the insole I during this upward movement of the toe post 22.

During the rise of the toe post 22 and shoe assembly supported thereon, the motor 128 is actuated to cause the toe holddown 112 to move downwardly to lightly clamp the forepart of the shoe assembly against the insole rest assembly 28 and to thereafter yieldably ride upwardly with the shoe assembly to maintain its clamping function throughout the rise thereof. The control circuit is so constructed as to insure that the slide plate 82 is in its fully forward position before the toe post 22 has been raised to a height such that the shoe assembly may engage the inner wall 252 of the yoke 176 and before the motor 128 is actuated.

When the machine is to be used in the manufacture of non-moccasin type shoes, having no ridge line R, the operator presets the control circuit, in a manner described below, so as to actuate the motor 192 to cause the yoke 176 to be yieldably urged forwardly under relatively low pressure such that when the slide plate 82 has moved to its full forward position the yoke 176 will be above the shoe assembly as shown in phantom in FIGURE 15 and in readiness to perform its upwiping function thereon when the shoe assembly is urged upwardly therethrough. When the machine is to be used in the manufacture of moccasin-type shoes having a ridge line R, the operator presets the control circuits so as to actuate the motor 192 to cause the yoke 176 to be maintained in a rearward, out-of-the-way position such that it may not be engaged by the shoe assembly during the rise thereof but to be activated to clamp the shoe assembly after the rise of the shoe assembly has terminated.

Figure 21:
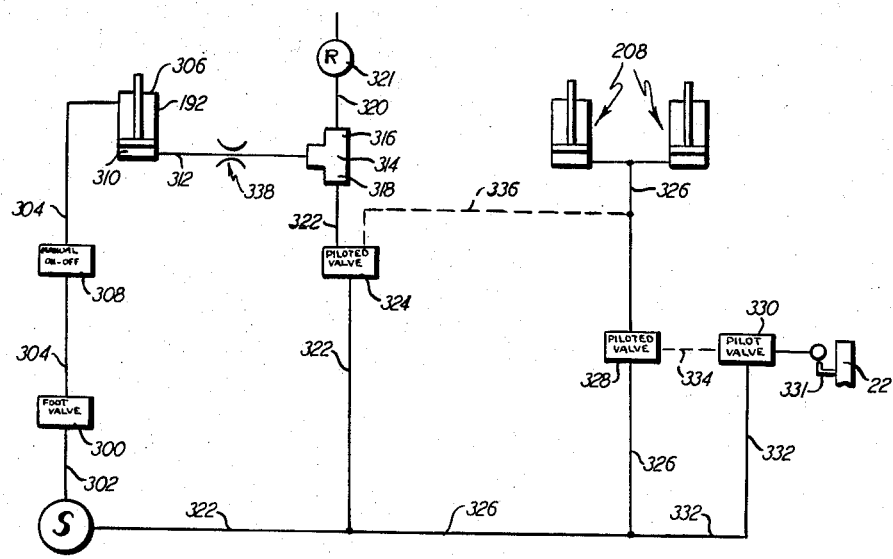
FIGURE 21 is a schematic of that portion of the pneumatic control circuit that controls the operation of the yoke mechanism.

Referring to FIGURE 21 high pressure air is directed from a source S thereof to a valve 300 by means of the line 302. It should be noted that the valve 300 is activated manually by the operator after the pincers 66 and 68 have been actuated to grip the marginal portion of the upper and effect the aforementioned pulling over operation. Although not shown in FIGURE 21 actuation of the valve 300 serves to initiate the operation of the remainder of the control circuit until the machine has completed its full cycle of operation. Only that portion of the control circuit that is associated with the valve 300 and is germane to the operation of the yoke 176 and bumpers 222 is shown. A line 304 connects the outlet of the valve 300 and the rod end 306 of the motor 192 that drives the yoke 176 in a forward-rearward direction. Interposed along the line 304 is a selector valve 308 by which the operator may alternatively permit or preclude the flow of high pressure air from the valve 300 to the rod end 306 of the motor 192 by means of the line 304. Air may be introduced to the head end 310 of the motor 192 by means of the line 312 which is connected to the outlet of the shuttle valve 314. The shuttle valve 314 has a low pressure inlet port 316 and a high pressure inlet port 318 and is of such construction that when both high and low pressure air is introduced to the shuttle valve the low pressure inlet port 316 will be closed and the high pressure air may flow through the outlet of the shuttle valve 314 and when only low pressure air is introduced into the shuttle valve the high pressure inlet port 318 may be closed and low pressure air will flow from the outlet port of the shuttle valve and into the line 312. Low pressure air is directed to the shuttle valve 314 by means of the line 320 and high pressure air is introduced to the shuttle valve 314 by means of the line 322 that is connected to the source S of high pressure air. The magnitude of the low pressure in the line 320 is controlled by a regulator 321 and may be adjusted to vary the pressure in the head end 310 of the motor 192 and consequently the force that the yoke 176 may exert on the shoe upper U during the upwiping operation. An air operated valve 324 is interposed along the line 322 and serves to alternatively permit or preclude the flow of high pressure air from the source S thereof through the line 322 and into the high pressure inlet port 318 of the shuttle valve 314.

The bumpers 222 are actuated by means of high pressure air that is directed to the motors 208 by means of the line 326 which leads from the source S of high pressure air. Interposed along the line 326 is an air actuated valve 328 which serves to alternatively permit or preclude the flow of high pressure air from the source thereof to the motors 208. A cam operated pilot valve 330 is operatively associated with the toe post 22 so as to be actuated by the cam 331 when the toe post 22 has reached its furthest upward position thus terminating the rise of the shoe assembly (see FIGURE 3). High pressure air is directed from the source S thereof to the pilot valve 330 by means of the line 332 and upon actuation of the pilot valve 330 the high pressure air is permitted to pass therethrough and into the line 334 which directs the high pressure air to the air actuated valve 328 in the line so as to actuate the valve 328 and permit high pressure air to flow from the source thereof through the line 326 and into the motors 208 to operate the bumpers 222. Actuation of the valve 328 also permits air to flow through the line 336 and to the air actuated valve 324 to open the valve 324 thereby permitting high pressure air to flow from the source thereof through the line 322 and into the high pressure inlet port 318 of the shuttle valve 314 thereby closing the low pressure inlet port 316 of the shuttle valve 314 and permitting the high pressure air to flow through the line 312 and into the head end 310 of the motor 192 to thus urge the yoke 176 forwardly into clamping engagement with the shoe assembly.

When the apparatus is to be used in the manufacture of moccasin type shoes having a ridge or seam line R the manually operated selector valve 308 is opened to permit the high pressure air to flow through the line 304 and into the rod end 306 of the motor 192 when the valve 300 is actuated to establish a pressure differential in the motor 192 thus urging and maintaining the piston rod 196 of the motor 192 into a retractile position within the motor 192 and maintaining the yoke 176 in a rearward and out-of-the-way position. Inasmuch as the valve 324 is not actuated until after the toe post 22 rises to actuate the pilot valve 330 there is no flow of high pressure air through the shuttle valve 314 and into the head end 310 of the motor 192. It is inconsequential that low pressure air flows through the shuttle valve 314 the line 312 and into the head end 310 of the motor 192 because the high pressure air in the rod end 306 of the motor may overcome the low pressure air in the head end of the motor 192. Thus as the toe post rises the yoke 176 will be maintained in an out-of-the-way position. When the toe post and the shoe assembly supported thereon have completed their rise the pilot valve 330 becomes actuated to permit air to flow therethrough and into the valve 328 by means of the line 334 thereby actuating the valve 328 and permitting air to flow from the source S thereof through the line 326 and to the motors 208 thereby causing the bumpers 222 to be pressed inwardly against the sides of the shoe assembly to clamp the upper U to the last L. When the valve 328 is actuated so as to permit air to flow toward the motors 208 air also flows through the line 236 to actuate the valve 324 thus permitting high pressure air to flow from the source thereof through the line 322 and into the high pressure inlet port 318 of the shuttle valve 314 thereby closing the low pressure inlet port 316 of the shuttle valve 314 and directing high pressure air to flow through the line 312 and into the head end 310 of the motor 192 to thereby urge the yoke into forward pressing engagement with the shoe assembly. It should be noted that when the foot valve 300 is in a deactuated condition high pressure air is permitted to flow through the line 304 and towards the rod end 306 of the motor 192 such that when the manually operated selector valve 308 is in an open position the yoke 176 may be maintained in an out-of-the-way and rearward position prior to actuation of the foot valve 300. The foot valve 300 is so constructed that when it is actuated the line 304 and consequently the rod end 306 of the motor 192 is vented to the atmosphere so that when the foot valve 300 is actuated the low pressure air that is present in the head end of the motor 192 will tend to urge the piston rod of the motor and consequently the yoke 176 to a forward position. Inasmuch as it is essential that the yoke 176 be maintained in a rearward out-of-the-way position until the toe post 22 and shoe assembly supported thereon have completed their rise, a restrictor 338 may be placed in the line 312 between the valve 314 and the motor 192 so as to retard the forward motion of the yoke 176 and permit the shoe assembly to terminate its rise before the yoke 176 has been urged to a forward position where it might engage the shoe assembly prematurely. The forward movement of the yoke 176 may also be retarded by means of the pressure regulator 321 which may be adjusted so as to completely preclude the flow of low pressure air through the lines 320, 312 and into the head end 310 of the motor 192. Thus when the valve 300 is actuated and the high pressure air in the rod end 306 of the motor 192 is exhausted to the atmosphere there will be no pressurized air in the head end 310 of the motor 102 and the motor 192 will remain in the same position (maintaining the yoke 176 in a rearward, out-of-the-way position) until high pressure air is introduced into the head end 310 of the motor 192 to effect a clamping of the shoe assembly by the yoke 176. When operated in this manner there is no upwiping operation because the yoke 176 is maintained out of engagement with the shoe assembly until after the shoe assembly has completed its rise.

When the toe post has completed its rise the pilot valve 330 is actuated as aforesaid and causes actuation of the motors 208 to urge the bumpers 222 and yoke 176 to pressing and clamping engagement with the shoe assembly.

When a shoe of a non-moccasin type not having a seam or ridge line is to be fabricated in the machine the manually operated selector valve 308 is closed so as to preclude flow of high pressure air from the source S thereof to the rod end of the motor 192. Thus low pressure air passes through the shuttle valve 314 and is directed into the head end 306 of the motor 192 by means of the line 312 to reverse the pressure differential in the motor 192 so as to resiliently and yieldably maintain the yoke 176 in a forward position such that when the main slide plate 82 is brought forward the yoke 176 will be disposed above the shoe and in readiness to engage the shoe assembly and perform the aforesaid upwiping operation when the shoe assembly is raised. The force with which the inner wall 252 of the yoke 176 is urged against the upper U during the upwiping operation may be adjusted by means of the pressure regulator, the magnitude of the force being dependent on the frailty of the upper and the amount of upwiping desired. When the upwiping operation has been completed and the toe post is at its uppermost position the pilot valve is actuated thereby effecting introduction of high pressure air into the motors 208 and 192 in the same manner as before thus increasing the magnitude of said reversed pressure differential to thereby urge the bumpers and yoke into pressing and clamping engagement with the shoe assembly.

Figure 17:
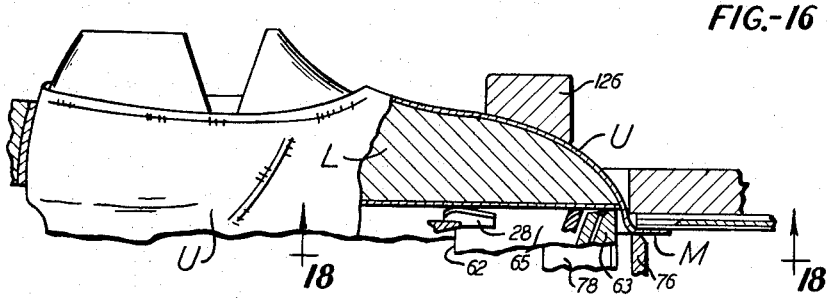
FIGURE 17 is a representation of the shoe assembly as it appears in the machine after the shoe assembly has been raised through the yoke assembly and the upwiping operation has been completed and further illustrating the level of the bottom of the insole being slightly higher than the level of the tops of the wipers in readiness for the wiping operation.
Figure 18:
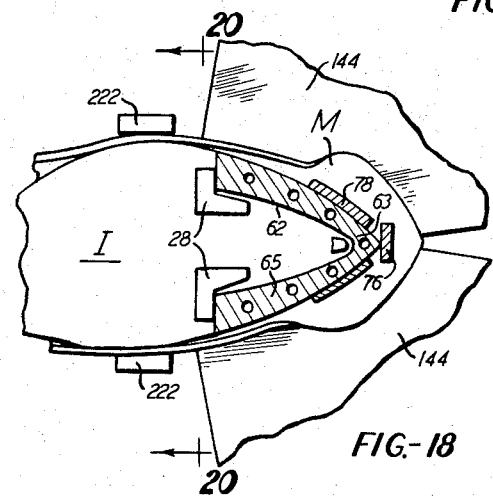
FIGURE 18 is a view taken along the line 18—18 of FIGURE 17.
Figure 19:
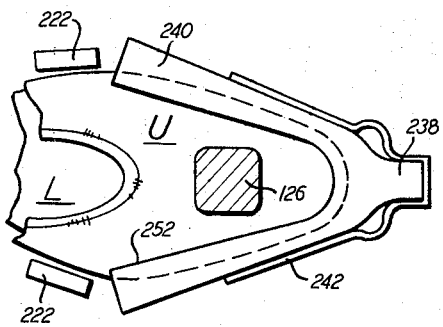
FIGURE 19 is a plan view representing the shoe assembly, yoke assembly and uppers during the rise of the shoe assembly through the yoke.
Figure 20:
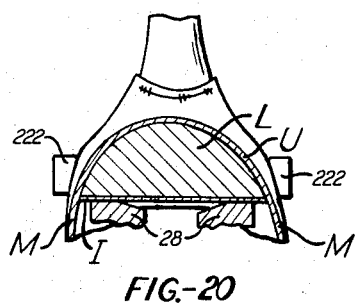
FIGURE 20 is a view taken along the line 20—20 of FIGURE 18.

At about the same time as the yoke 176 and bumpers 222 are actuated to perform their clamping function, the motor 272 is actuated to bring the heel clamp 266 rearwardly into engagement with the heel end of the shoe and the retarders 76 and 78 are urged upwardly under a greater force than had been heretofore exerted so as to firmly press the upper margin M to the underside of the wipers 144, the wipers 144 being so disposed on the slide plate 82 that when the slide plate 82 is moved to its forward, working position they may be above the retarders 76 and 78 (see FIGURES 17, 18). The control circuit then causes the pincers 70 and 74 to release the upper margin and the motor 150 is actuated to effect a wiping stroke of the wipers 144. As the wipers 144 move through their stroke the upper margin slides between the upper surface of the retarders 76 and 78 and the bottom surface of the wipers 144, the adhesive applicator assembly 30 and insole rest assembly 30 being retracted downwardly out of the way as the wipers 144 are advanced to preclude mechanical interference. Thus when the wipers 144 have completed their stroke the shoe assembly is supported solely by the upper surface of the wipers. The holddown 112 is then more forceably pressed against the shoe assembly for a predetermined length of time to firmly press the margin M to the insole and effect a permanent bond. The control circuit then causes the various mechanisms to be returned to their idle, non-working positions and the lasted shoe assembly may be removed from the machine.

I claim:
1. A shoe machine comprising:
  means for supporting a shoe assembly in a bottom-down position, said shoe assembly including a last having a shoe upper draped thereabout;
  a flexible, resilient, upwiping member having a surface thereof of a contour substantially paralleling that of a selected portion of said shoe assembly;
  means mounting said upwiping member to said machine for movement between a first position wherein said upwiping member is in an out-of-the-way, remote position and a second, forward position wherein said upwiping member is in a working position that is above and in paralleling, overlapping relationship to said selected portion of said shoe assembly;
  means for effecting relative heightwise movement between said shoe assembly support means and said upwiping member so as to cause engagement of said selected portion of said shoe assembly with said paralleling surface of said upwiping member when said upwiping member is in said second position, said means for effecting said relative heightwise movement being of such construction as to continue said relative heightwise movement subsequent to engagement of said shoe assembly with said paralleling surface of said upwiping member, said upwiping member effecting a pressing of said upper to said last while said relative heightwise movement of said shoe assembly and said upwiping member is being effected to thereby stretch said upper about and into conformity with said last;
  a force applying instrumentality operatively connected to said upwiping member;
  control means for said force applying means so constructed and arranged as to enable said force applying instrumentality to cause said upwiping member to be either in said first position or to be urged into said second, forward, working position under a first relatively low force during said relative heightwise movement of said upwiping member and said shoe assembly supporting means; and
  means, operative subsequently to the completion of said relative heightwise movement, to cause said force applying instrumentality to urge said upwiping member forwardly under a second force that is greater than said first force.

2. A shoe machine comprising:
  means for supporting a shoe assembly in a bottom-down position, said shoe assembly including a last having an insole located at the bottom thereof and a shoe upper draped thereabout in such a manner that a marginal portion of said shoe upper extends downwardly beyond the level of said insole;
  a flexible, resilient upwiping member having a surface thereof of a contour paralleling that of a projected peripheral region of a selected portion of said shoe assembly, said paralleling surface thereof being of smaller dimensions than that of said selected portion of said shoe assembly;
  means mounting said upwiping member to said machine for movement between a first position wherein said upwiping member is in an out-of-the-way, remote position and a second position wherein said upwiping member is in a working position that is above and in paralleling, overlapping relationship to said selected portion of said shoe assembly;
  means for effecting relative heightwise movement between said shoe assembly support means and said upwiping member so as to cause engagement of said selected portion of said shoe assembly with said paralleling surface of said upwiping member when said upwiping member is in said second position, said means for effecting said relative heightwise movement being of such construction as to continue said relative heightwise movement subsequent to engagement of said shoe assembly with said paralleling surface of said upwiping member, said flexible and resilient construction of said upwiping member effecting a pressing of said upper to said last while said relative heightwise movement of said shoe assembly and said upwiping member is being effected to thereby stretch said upper about and into conformity with said last;
  means for selectively maintaining said upwiping member in either of said positions during said relative heightwise movement of said shoe assembly supporting means and said upwiping member whereby when said upwiping member is in said first position said shoe assembly may be precluded from engagement with said upwiping member is in said second position said shoe assembly may be brought into engagement with said upwiping member when said relative heightwise movement is effected therebetween, said means for selectively maintaining said upwiping member in either of said positions comprising:
  force applying means for applying forwardly directed force to said upwiping member so as to urge said upwiping member to said second, forward, working position;
  means actuable to resist the effect of said forward force so as to maintain said upwiping member in said first position;
  means for deactivating said resisting means so as to permit said force applying means to effect movement of said upwiping member to said second, forward position such that said shoe assembly may be brought into engagement with said upwiping member when said relative heightwise movement is effected therebetween; and
  means for thereafter causing said force applying means to increase the magnitude of said forwardly directed force on said upwiping member, said increased force being effective to urge said wiping member more firmly against the shoe assembly to thereby effect a clamping of the shoe upper to the last.

3. An apparatus as recited in claim 2 wherein said force applying means comprises an air operated motor operatively connected to said upwiping member, said motor being in communication with air under a relatively low pressure so as to actuate said motor to effect movement of and yieldably maintain said upwiping member in said second, forward, working position and wherein said means for resisting the effect of said forward force comprises:
  means communicating air under a relatively high pressure to said motor, said motor being so constructed as to direct said high pressure air so as to exert a force in opposition to said low pressure air thereby overcoming the effect of said low pressure air thus maintaining said motor in a position such that said upwiping member is retained in said first remote position.

4. An apparatus as recited in claim 3 wherein said means for deactivating said resisting means comprises:

control means interposed along said high pressure communicating means and being adapted to preclude the flow of said high pressure air from said source thereof to said air motor whereby upon operation of said control means to permit said high pressure air to flow to said air motor, said upwiping member may be maintained in said first position and whereby upon actuation of said control means to preclude said high pressure air to flow to said motor said low pressure air may be effective to yieldably urge said upwiping member into said second position.

5. An apparatus as recited in claim 3 wherein said means for causing said force applying means to increase the magnitude of said forwardly directed force on said upwiping member comprises:

means for increasing the pressure of said low pressure air while said upwiping member is in said second position and subsequent to the relative heightwise movement of said shoe assembly and said upwiping member so as to urge said upwiping member more firmly against the shoe assembly to thereby effect a clamping of the shoe upper to the last.

6. An apparatus as recited in claim 5 wherein said means for deactivating said resisting means comprises:

control means interposed along said high pressure communicating means and being adapted to preclude the flow of high pressure air from said source thereof to said air motor whereby upon operation of said control means to permit said high pressure air to flow to said air motor, said upwiping member may be maintained in said first position and whereby upon actuation of said control means to preclude said high pressure air to flow to said motor, said low pressure air may be effective to yieldably urge said upwiping member into said second position.

7. An apparatus as recited in claim 2 wherein said force applying means comprises an air operated motor operatively connected to said upwiping member, said motor being in communication with air under a relatively low pressure so as to actuate said motor to effect movement of and yieldably maintain said upwiping member in said second, forward working position and wherein the means for thereafter causing said force applying means to increase the magnitude of said forwardly directed force on said upwiping member comprises:

means for increasing the presure of said relatively low presure air while said upwiping member is in said second position and subsequent to the rise of said shoe assembly so as to urge said upwiping member more firmly against the shoe assembly to thereby effect a clamping of the shoe upper to the last.

8. A shoe machine comprising:

means for supporting a shoe assembly in a bottom-down position, said shoe assembly including a last having an insole located at the bottom thereof and a shoe upper draped thereabout in such a manner that a marginal portion of said shoe upper extends downwardly beyond the level of said insole;

a flexible, resilient upwiping member having a surface thereof of a contour paralleling that of a projected peripheral region of a selected portion of said shoe assembly, said paralleling surface thereof being of smaller dimensions than that of said selected portion of said shoe assembly;

means mounting said upwiping member to said machine for movement between a first position wherein said upwiping member is in an out-of-the-way, remote position and a second position wherein said upwiping member is in a working position that is above and in paralleling, overlapping relationship to said selected portion of said shoe assembly;

means for effecting relative heightwise movement between said shoe assembly support means and said upwiping member so as to cause engagement of said selected portion of said shoe assembly with said paralleling surface of said upwiping member when said upwiping member is in said second position, said means for effecting said relative heightwise movement being of such construction as to continue said relative heightwise movement subsequent to engagement of said shoe assembly with said paralleling surface of said upwiping member, said flexible and resilient construction of said upwiping member effecting a pressing of said upper to said last while said relative heightwise movement of said shoe assembly and said upwiping member is being effected to thereby stretch said upper about and into conformity with said last;

means for selectively maintaining said upwiping member in either of said positions during said relative heightwise movement of said shoe assembly supporting means and said upwiping member whereby when said upwiping member is in said first position said shoe assembly may be precluded from engagement with said upwiping member and when said upwiping member is in said second position said shoe assembly may be brought into engagement with said upwiping member when said relative heightwise movement is effected therebetween, said means for selectively maintaining said upwiping member in either of said positions comprising:

an air operated motor connected to said upwiping member for effecting said movement of said upwiping member between said first and said second positions thereof, said motor being operative in response to differential pressures communicated thereto;

means for introducing air from at least two sources thereof having different pressures to said motor in such a manner that the pressure differential therebetween may effect actuation of said motor so as to effect movement of said upwiping member to said first position;

means for reversing the pressure differential directed to said motor so as to effect actuation of said motor to move said upwiping member from said first to said second position; and means for increasing said reversed pressure differential introduced to said motor so as to more firmly urge said upwiping member into said second position whereby said upwiping member may effect a firm clamping of said shoe assembly subsequent to the rise thereof.

References Cited

UNITED STATES PATENTS

| 2,324,509 | 7/1943 | Jorgensen | 12—7.1 |
| 2,986,753 | 6/1961 | Gilbride | 12—8.2 |
| 3,037,222 | 6/1962 | Kamborian et al. | 12—14.4 X |
| 3,051,969 | 9/1962 | Kamborian et al. | 12—14.4 X |

PATRICK D. LAWSON, *Primary Examiner.*

PO-1050
(5/69)

UNITED STATES PATENT OFFICE
CERTIFICATE OF CORRECTION

Patent No. 3,372,414          Dated   March 12, 1968

Inventor(s)   James H. Arsenault

It is certified that error appears in the above-identified patent and that said Letters Patent are hereby corrected as shown below:

Column 7: line 4, delete "the yoke wall"; line 18, change "232" to --228--.

SIGNED AND
SEALED
OCT 21 1969

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,372,414　　　　　　　　Dated March 12, 1968

Inventor(s) James H. Arsenault

It is certified that error appears in the above-identified patent and that said Letters Patent are hereby corrected as shown below:

Column 11: line 18, insert --326-- after "line"; line 61, change "236" to --336--.
Column 13: lines 49, 53 and 61, change "instrumentality" to --means--.

Signed and sealed this 18th day of May 1971.

(SEAL)
Attest:

EDWARD M. FLETCHER, JR.
Attesting Officer

WILLIAM E. SCHUYLER, JR.
Commissioner of Patents